C. E. ANDERSON AND F. P. PERKINS.
AIR LIFT WATER SYSTEM.
APPLICATION FILED MAY 27, 1921.
1,436,425.
Patented Nov. 21, 1922.
2 SHEETS—SHEET 1.
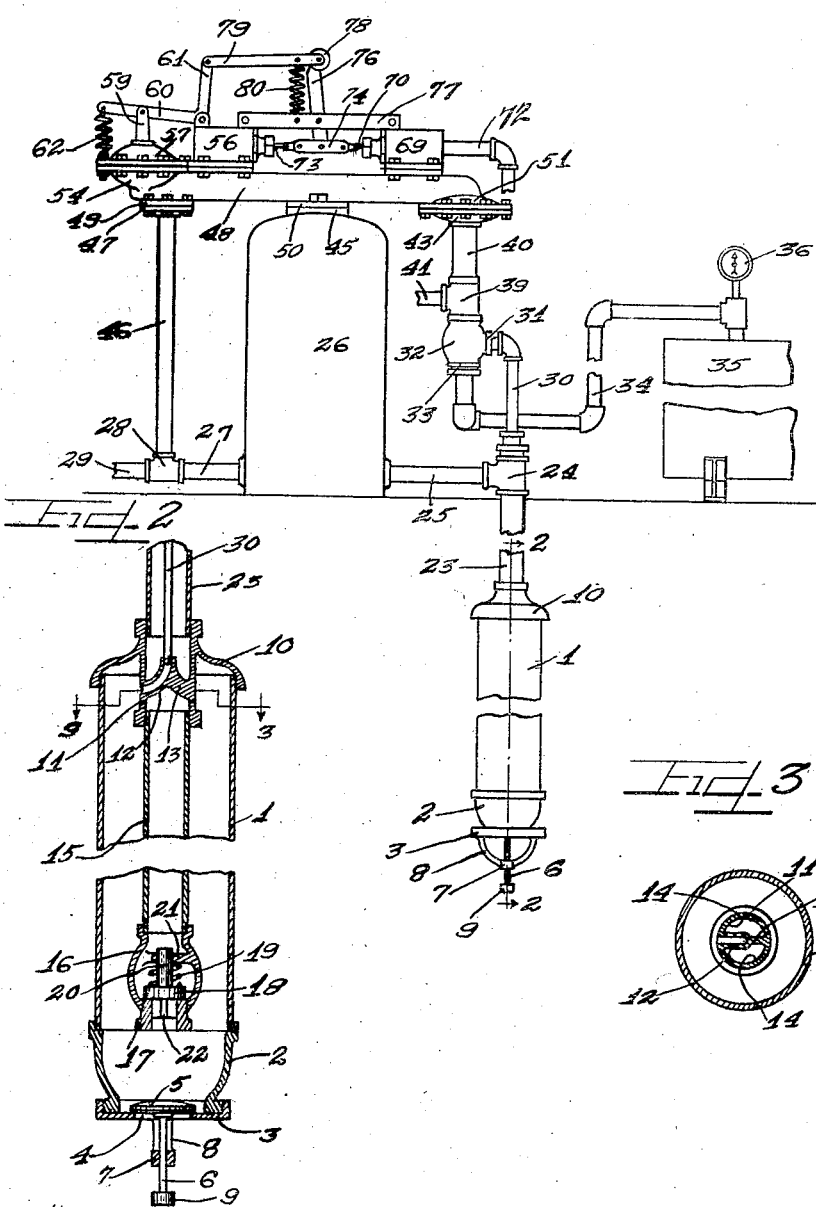
Witnesses
Inventors
Charles E. Anderson
Frank P. Perkins.
By Atty.

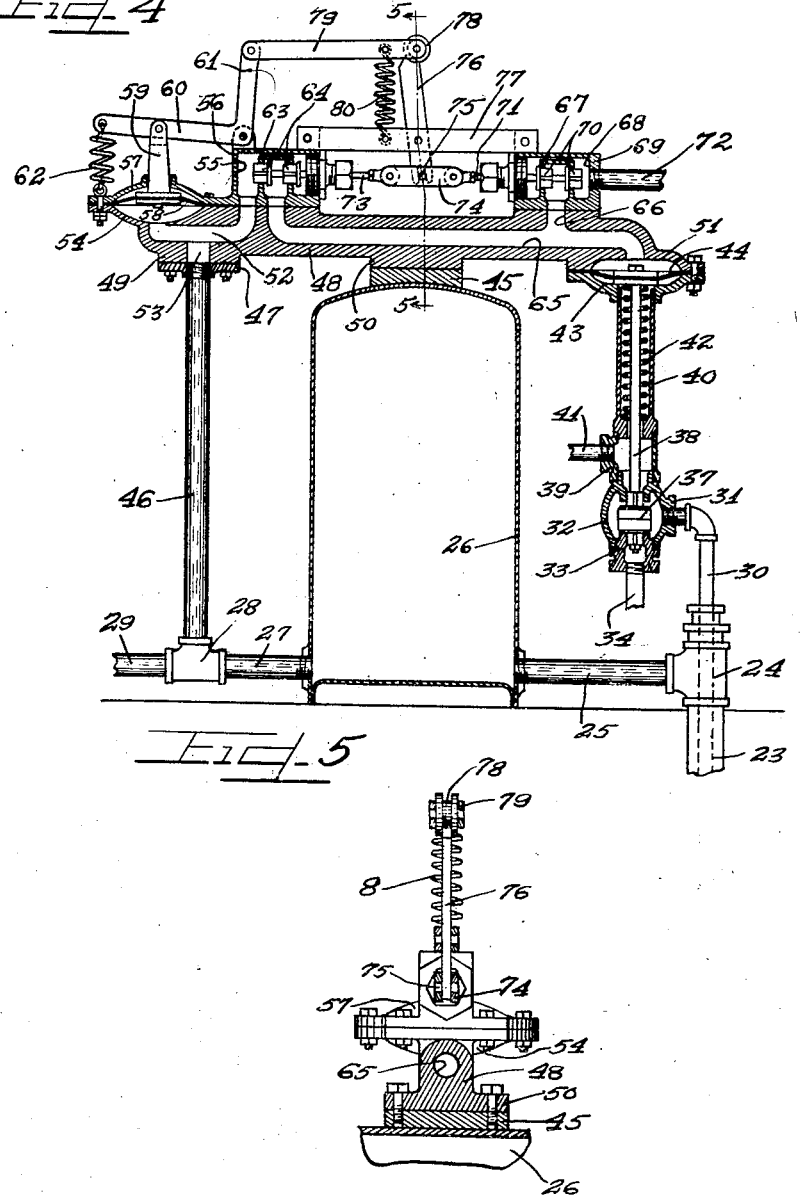

Patented Nov. 21, 1922.

1,436,425

UNITED STATES PATENT OFFICE.

CHARLES E. ANDERSON, OF CHICAGO, AND FRANK P. PERKINS, OF PARK RIDGE, ILLINOIS.

AIR-LIFT WATER SYSTEM.

Application filed May 27, 1921. Serial No. 472,983.

*To all whom it may concern:*

Be it known that we, CHARLES E. ANDERSON and FRANK P. PERKINS, citizens of the United States, and residents, respectively, of the city of Chicago, in the county of Cook and State of Illinois, and of the town of Park Ridge, in the county of Cook and State of Illinois, have invented certain new and useful Improvements in an Air-Lift Water System; and we do hereby declare that the following is a full, clear, and exact description of the same, reference being had to the accompanying drawings, and to the numerals of reference marked thereon, which form a part of this specification.

This invention relates more particularly to an improved and simplified form of an air lift water system wherein water from a well or cistern is forced by means of air pressure into a water pressure tank until a predetermined pressure is reached, at which time control valves are automatically operated to shut off the supply of compressed air until sufficient water has been drawn from the water tank through service pipes to reduce the pressure in said water tank to a predetermined pressure at which the control valves are again automatically operated to permit compressed air to replenish the supply of water in the water tank.

It is an object of this invention to provide an automatically operated air lift water system for the purpose of supplying country and suburban homes with fresh running water.

It is also an object of the invention to provide a private water supply system the control mechanisms of which are automatically governed by the pressure of the water in a water storage tank connected with service faucets.

Another object of the invention is to provide an air lift water system whereby water from a cistern or well may be lifted by compressed air the flow of which is governed by a valve operable by a diaphragm mechanism controlled by the pressure in a tank into which the water is forced.

It is a further object of this invention to provide a private water supply system wherein it is only necessary to open a faucet to receive a flow of water the supply of which is automatically controlled by diaphragm mechanisms which govern an air valve through which air under high pressure is permitted to flow into a cylinder submerged in a cistern or well to lift water into a pressure tank.

It is an important object of this invention to provide a simple and effective air lift liquid system adapted to be readily installed, and operating automatically to maintain the pressure on the liquid in a pressure tank above a predetermined point so that liquid may be supplied to faucets or other means through a service pipe at all times.

Other and further important objects of this invention will be apparent from the disclosures in the specification and the accompanying drawings.

The invention (in a preferred form) is illustrated in the drawings and hereinafter more fully described.

On the drawings:

Figure 1 is an elevation of an air lift water system embodying the principles of this invention showing parts broken away.

Figure 2 is an enlarged detail section taken on line 2—2 of Figure 1 with parts in elevation.

Figure 3 is a transverse detail section taken on line 3—3 of Figure 2.

Figure 4 is a central vertical section through the water pressure tank and through the control mechanisms of the system.

Figure 5 is a detail section taken on line 5—5 of Figure 4.

As shown on the drawings:

The air lift water system comprises a cylinder 1 adapted to be suspended in a water cistern or well below the water level. Threaded or otherwise secured on the lower end of the cylinder 1 is an extension 2 on the lower open end of which a valve supporting base plate 3 is secured. The base plate 3 is provided with a water inlet opening 4 controlled by a check valve 5. The stem 6 of the check valve 5 slidably projects downwardly through the opening 4 and through a guide collar 7 forming a part of a spider 8 integrally formed on the bottom of said base plate. A head or stop 9 is provided on the lower end of the valve stem 6 to limit the upward movement of the water inlet valve 5. Secured on the upper end of the cylinder 1 is a cover or cap 10. Integrally formed axially within the cylinder cover 10 is a water outlet tube 11 having a compressed air inlet elbow 12 integrally formed therein and opening through one side of said tube 11. The elbow 12 is braced by an integral web or arm 13. Water outlet openings 14 are provided in the outlet tube 11 on opposite sides of the elbow 12 and the web 13 as illustrated in Figure 3. The tube 11 projects into the cylinder 1 and has the upper end of a water outlet tube 15 secured thereto. The tube 15 projects downwardly in the cylinder and has supported on the lower end thereof a valve casing 16. A passaged valve seat 17 is removably secured in the lower end of the valve casing 16 and has a check valve 18 normally held seated thereon by means of a spring 19. This spring 19 is engaged around a valve stem 20 which slidably projects upwardly through a guide flange 21 integrally formed in said valve case. Guide webs 22 are formed on the bottom of the valve 18 and project into the opening in said valve seat 17.

The water intake cylinder 1 has the cover 10 thereof secured on the lower end of a water pipe 23 which projects upwardly out of the cistern or well and has the upper end secured to a three way union 24. Also attached to the union 24 is one end of a water inlet pipe 25, the other end of which is connected with the lower portion of a water pressure tank 26. Connected to the lower portion of the tank 26 is one end of a water outlet pipe 27, the other end of which is connected to a three way union or T 28. Secured in the union 28 is one end of a water line or service pipe 29. The service pipe 29 leads to the faucets in a water pipe system for a house or barn, or may be connected to deliver water for other purposes.

Connected to the upper inner end of the air inlet elbow 12 is the lower end of an air pipe 30. The air pipe 30 projects upwardly through the water pipe 23 and out through the union 24. The upper end of the air pipe 30 connects with the middle arm 31 of an air control valve casing 32. Removably engaged in the lower end of the air valve casing 32 is a valve seat 33 to which one end of a compressed air supply pipe 34 is connected. The air supply pipe 34 connects up with a large compressed air tank 35 provided with an air pressure gauge 36. The air tank 35 contains air at a pressure of from approximately seventy-five to a hundred pounds pressure. Disposed within the air valve casing 32 is a double seating air control valve 37 adapted to co-act with the valve seat 33. Attached to the air valve 37 is the lower end of a valve stem or rod 38 which projects upwardly through a union 39 and a sleeve 40 mounted upon the upper end of the air valve casing 32. Leading from the union 39 is an air exhaust pipe 41.

A control spring 42 is disposed within the sleeve 40 around the valve stem 38. A lower diaphragm housing section 43 is mounted upon the upper end of the sleeve 40. The upper end of the valve stem 38 is attached to the middle portion of a control diaphragm 44 against which the coil 42 presses.

Rigidly secured upon the top of the closed water pressure tank 26 is a supporting head or block 45 the upper surface of which is in the plane of the flange of the diaphragm housing section 43. Connected to the middle arm of the union 28 is a water tube or pipe 46 having secured on the upper end thereof a supporting plate 47 disposed in the plane of the block 45.

Rigidly secured upon the tank block 45 and to the supporting plate 47 is a casting 48 having integrally formed on the bottom thereof an end boss 49, a middle boss 50 and upper diaphragm housing section 51 adapted to respectively seat upon the plate 47, the block 45 and the lower diaphragm housing section 43. The two diaphragm housing sections 43 and 51 are rigidly bolted together clamping the margin of the diaphragm 44 therebetween. The casting 48 is provided with a U-shaped passage 52 which communicates with the pipe 46 through an opening 53 in the casting boss 49. One end of the passage 52 connects with the chamber of a lower diaphragm housing section 54 which is integrally formed on one end of the casting 48. The other end of the passage 52 is directed upwardly and communicates with a chamber 55 provided in a control valve box or housing 56 which is rigidly secured on the top of the casting 48. Integral with the valve housing 56 is an upper diaphragm housing section 57 which is rigidly secured to the lower diaphragm housing section 54. A control diaphragm 58 is clamped in place between the two diaphragm housing sections 54 and 57. Connected to the diaphragm 58 is an arm 59 which projects upwardly out of the upper diaphragm housing section 57 and has the upper end pivotally attached to the long arm 60 of a bell-crank pivotally supported on the valve housing 56. The long bell-crank arm 60 is integral with a short bell-crank arm 61. A coiled spring 62 is connected to the diaphragm housing 54—57 and to the end of the long bell-crank arm 60.

Integrally formed within the valve housing 56 is a double valve seat 63 with which a double valve 64 co-acts. Also provided in the casting 48 is a longitudinal passage 65 one end of which communicates with the chamber within the double valve seat member 63. The other end of the passage 65 is directed downwardly and communicates with the chamber above the diaphragm 44. Leading from the passage 65 is a passage 66 which communicates with a chamber formed within a double valve seat member 67. The double valve seat member 67 is located within a chamber 68 of a valve box or housing 69 secured upon a boss on the top of the casting 48. Co-acting with the double valve seat member 67 is a double valve 70 having a stem 71. An exhaust pipe 72 is connected with the valve housing 69. A valve stem 73 is connected to the double valve 64. The valve stems 71 and 73 are pivotally connected to opposite ends of a double bar link 74. A pin 75 is provided on the link 74. Engaged on the pin 75 between the bars of the link 74 is the notched lower end of a fulcrumed lever 76. The lever 76 is fulcrumed in a bridge bar 77 mounted on the tops of the valve housings 56 and 69. The upper end of the lever 76 is tapered to coact with a roller 78 supported between the members forming a valve control bar 79. A coiled spring 80 is connected to the bar 79 and to the bridge bar 77 to hold the roller in engagement with the tapered end of lever 76.

The operation is as follows:

The device described is for the purpose of lifting water by air pressure into a tank from which the water may be drawn as required. Normally the control diaphragms 44 and 58 are straight due to the fact that the pressure in the tank 26 is less than the force exerted by the spring 62. The spring 62 thus acts to pull the bell-crank 60—61 downwardly whereby the bar 79 pulls the roller 78 over the tapered upper end of the lever 76. The lever 76 is thus swung away from the spring 80 thereby actuating the connecting link 74 whereby the valve 64 is closed and the valve 70 is opened. With valve 70 open water in the chamber 68 may be exhausted through the exhaust pipe 72. The air control spring 42 thus acts to hold the diaphragm 44 in a straight position and at the same time opens the air valve 37 and closes the air exhaust port 41.

When the air valve is open compressed air from the air pressure tank 35 at a high pressure of about eighty pounds flows through the pipe 34 and then through the pipe 30 and the air inlet elbow 12 into the cylinder 1. Water from the cistern or well enters the cylinder 1 through the water intake opening 4 around the valve 5. As soon as the air valve 37 is opened and the air under high pressure enters the upper portion of the cylinder the water admitted into said cylinder is forced upwardly through the valve seat member 17 and opens the check valve 18 against the pressure of the valve spring 19. The water is then lifted by air pressure upwardly through the water tube 15 and flows through the openings 14 out of the cylinder and into the water pressure tank 26 by way of the piping 23, 24 and 25. Water is thus continuously lifted by high air pressure from the submerged cylinder 1 into the water tank 26 until the pressure in the tank 26 reaches a predetermined amount about thirty pounds. When this pressure is reached the compressed air in the tank 26 acts to force water from said tank through the pipe 27 and the pipe 46 upwardly through the opening 53 into the casting passage 52 thus entering the lower diaphragm housing section 54 to force or deflect the diaphragm 58 upwardly into the position illustrated in Figure 4. The arm 59 is pushed upwardly by the diaphragm thereby swinging the bell-crank 60—61 upwardly whereby the bar 79 forces the roller 78 over the upper tapered end of the lever 76. The upper end of the lever 76 is thus pulled toward the spring 80 while the lower notched end actuates the connecting link 74 to simultaneously open the control valve 64 and close the exhaust valve 70. The under pressure water from the tank 26 is now permitted to flow from the passage 52 past the open valve 64 into the casting passage 65 to deflect the air control diaphragm 44 into the position illustrated in Figure 4. As the diaphragm 44 is depressed the air control valve 37 is closed against the action of the spring 42. As the valve 37 closes against the valve seat 33 the air exhaust port 41 is opened to permit the air from the cylinder 1 to escape, thereby permitting water from the well or cistern to open the inlet valve 5 and fill the cylinder 1. With the closing of the air valve 37 the supply of high pressure air from the air pressure tank 35 is automatically shut off thereby stopping the lifting of water from the cylinder 1 into the tank 26.

The service pipe 29 connects the water tank 26 with the various faucets in a water distributing system. By opening a faucet water is forced therefrom due to the compressed air which is trapped in said tank above the water.

After sufficient water has been drawn from the tank 26 to reduce the pressure therein to a predetermined amount of about fifteen pounds the control spring 62 acts automatically to pull the bell-crank 60—61 downwardly back into normal position thereby causing the arm 59 to slide inwardly to return the deflected diaphragm back into normal straight position. With the downward swing of the bell-crank 60—61 the bar 79 acts to pull the roller 78 back over the tapered top of the pivoted lever 76 thereby causing the upper portion of the lever 76 to swing away from the spring 80 as the lower end of the lever swings to actuate the connecting link 74 to simultaneously close the valve 64 and open the exhaust valve 70. With the valve 70 open the pressure in the passage 65 and in the chamber above the diaphragm 44 is relieved since some of the water from said passage 65 is permitted to pass outwardly through the passage 66 to be discharged through the exhaust pipe 72. As soon as the pressure above the diaphragm 44 is reduced the air valve control spring 42 acts automatically to force the deflected diaphragm 44 back into normal straight position thereby automatically lifting the air valve 37 from the lower valve seat 33 upwardly against the upper valve seat to close the air exhaust port 41. The entire cycle of operations is now permitted to be repeated.

The capacity of the water tank 26 is such that the water in the cylinder 1 is not permitted to drop below the upper level of the check valve casing 16, thereby preventing air from flowing through the valve 17—18.

The device is simple and compact and may be readily installed for use in suburban and country houses or in places where a fresh water supply under pressure is desired. It will of course be understood that liquids other than water, such as oil, for example, may be lifted in the same manner by this device.

We are aware that numerous details of construction may be varied through a wide range without departing from the principles of this invention, and we therefore do not purpose limiting the patent granted otherwise than necessitated by the prior art.

We claim as our invention:

1. An air lift water system comprising a cylinder adapted to be submerged in a well or cistern, a water inlet valve in said cylinder to permit water to be lifted to enter the cylinder, a water tank connected with said cylinder, a water outlet valve in said cylinder controlling the flow of water therefrom, means for supplying air under high pressure to said cylinder to open the water outlet valve and lift the water from the cylinder into said tank to compress the air in said tank, an air control valve between said cylinder and said high pressure air supply means, a passaged casting supported on said tank, an air control diaphragm supported by said casting and connected with said air control valve, a service pipe connected to said tank, a pipe from said service pipe to said passaged casting, a diaphragm mechanism supported by the casting, a water control valve and a water exhaust valve supported on said casting and connected with the passages thereof, means connecting said water control valve and said water exhaust valve, a fulcrumed lever connected with said valve connecting means, spring controlled roller means co-acting with said lever to cause opening of the water control valve as the water exhaust valve is closed, and a spring controlled bell crank connected with said spring controlled roller means and with said diaphragm mechanism to automatically cause the water control valve to open and the water exhaust valve to close to cause closing of the air control valve when the pressure in the water tank reaches a predetermined point.

2. An air lift water system comprising a cylinder from which water is to be lifted, a tank into which water is to be delivered from said cylinder, a pair of valves in said cylinder, means for supplying high pressure air into said cylinder to close one of said valves and open the other to permit the water in said cylinder to be lifted by air pressure into said tank, an air control valve between said cylinder and said air supply means, an air control diaphragm connected with said air control valve, a control diaphragm mechanism, a passaged member between said diaphragms, a plurality of connected control valves on said passaged member for governing the operation of said air control diaphragm, and means connected with said control diaphragm mechanism for simultaneously operating said connected control valves to cause closing of the air control valve when the pressure in the water tank has reached a predetermined amount.

3. An air lift water system comprising a cylinder from which water is to be lifted, a tank connected therewith for receiving the water, water control valves in said cylinder, an air pressure tank, an air control valve between the air pressure tank and said cylinder, a service pipe leading from the water tank, a passaged member, a pipe connecting said passaged member with said service pipe, a plurality of connected valves on said member, and a diaphragm operated mechanism controlled by the pressure of the water in said tank for simultaneously operating said connected valves to govern the opening and the closing of the air control valve for the purpose of governing the lifting of water from the cylinder into said tank.

4. An air lift water system comprising a cylinder from which water is to be lifted, a tank connected therewith for receiving the water, water control valves in said cylinder, means for supplying air under pressure into said cylinder to cause operation of the water control valves to permit water from the cylinder to be lifted by air pressure into said tank, an air control valve between the air supply means and said cylinder, a diaphragm mechanism governing the operation of said air control valve, an air exhaust between the air control valve and said diaphragm mechanism, a service pipe leading from said tank, a passaged casting on said tank connected with said diaphragm mechanism, a pipe connecting said service pipe with said casting, an exhaust valve supported on said casting, a diaphragm control valve on said casting, a link connecting said exhaust valve and said diaphragm control valve, a fulcrumed lever for shifting said link, a pivoted bell crank, a bar pivotally connected thereto, a roller on said bar to coact with said lever, a spring for holding said roller in coacting relation with said lever, a diaphragm in said casting, a spring connecting the bell crank with said casting, and an arm connected to said diaphragm and to said bell crank.

5. An air lift water system comprising a cylinder from which water is to be lifted, a tank connected therewith for receiving the water, means for supplying air under pressure to said cylinder to lift water into the tank, an air control mechanism between the cylinder and said air supply means, a service line leading from said tank, and mechanisms connected between said service line and said air control mechanism adapted to act automatically to shut off the supply of air under pressure to said cylinder when the pressure in said tank reaches a predetermined point.

6. An air lift water system comprising a cylinder adapted to be located in a well or cistern from which water is to be lifted, a tank connected with the cylinder, means for supplying air into said cylinder under high pressure to cause water in the cylinder to be lifted into the tank, a diaphragm air control mechanism between said cylinder and said air supply means, control valves connected with said diaphragm mechanism, a diaphragm device connected with said tank and governed by the pressure therein, and means connecting said diaphragm device with said control valves to cause simultaneous operation of said valves to actuate the diaphragm air control mechanism to shut off the supply of air to the cylinder when a predetermined pressure is reached in said tank.

7. An air lift liquid system comprising a container adapted to be located in a well or cistern, a tank connected with the container, air pressure means connected with the container for causing liquid to be lifted therefrom into said tank, and pressure controlled mechanisms connected between the tank and said air pressure means adapted to be operated automatically to stop the operation of said air pressure means when a predetermined pressure is reached in said tank.

8. A liquid lift system comprising a container from which a liquid is to be lifted, a tank connected to receive a liquid therefrom, a control mechanism connected with said cylinder to govern the lifting of liquid from said cylinder into said tank, and mechanisms connected between said tank and said control mechanism adapted to act automatically to shut off the control mechanism when the pressure in said tank reaches a predetermined point.

9. A liquid lift system comprising a container, mechanisms for automatically supplying a liquid thereto, and means connected with said tank and said mechanisms adapted to act automatically to shut off said mechanisms when a predetermined pressure is reached in said container.

In testimony whereof, we have hereunto subscribed our names in the presence of two subscribing witnesses.
  CHARLES E. ANDERSON.
  FRANK P. PERKINS.
Witnesses:
  FRED E. PAESLER,
  JAMES M. O'BRIEN.